(12) United States Patent
Shattuck et al.

(10) Patent No.: US 11,572,976 B1
(45) Date of Patent: Feb. 7, 2023

(54) MULTIPLE ANGLE PIVOTING PLACEMENT (MAPP) STAND

(71) Applicant: The United States of America as Represented by the Secretary of the Navy, Indian Head, MD (US)

(72) Inventors: Mike Shattuck, Port Royal, VA (US); Lee Foltz, Indian Head, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/300,343

(22) Filed: May 17, 2021

(51) Int. Cl.
    *F16M 11/20*     (2006.01)
    *F42B 1/02*     (2006.01)

(52) U.S. Cl.
    CPC ..... *F16M 11/2078* (2013.01); *F16M 2200/08* (2013.01); *F42B 1/02* (2013.01)

(58) Field of Classification Search
    CPC ........... F16M 11/2078; F16M 2200/08; F16M 11/14; F42B 1/02; F16C 11/106; F16C 11/103; F16C 11/0633
    USPC ................ 248/481, 181.1, 181.2, 188.8, 615
    See application file for complete search history.

(56) References Cited

U.S. PATENT DOCUMENTS

| 1,186,428 | A | * | 6/1916 | Newman ................. F21V 21/29 248/276.1 |
| 3,100,445 | A | | 8/1963 | Poulter |
| 3,958,904 | A | | 5/1976 | Rusbach |
| 3,984,075 | A | * | 10/1976 | Bahner ............... E05B 73/0082 248/552 |
| 4,066,231 | A | * | 1/1978 | Bahner .................. B43M 99/00 248/289.11 |
| 4,242,036 | A | | 12/1980 | Slaght |
| 5,046,974 | A | * | 9/1991 | Griffin, Jr. ............. B63H 25/08 440/63 |
| 5,383,738 | A | * | 1/1995 | Herbermann .............. B25J 9/06 248/288.51 |
| 6,453,788 | B1 | * | 9/2002 | Lebet ...................... F41H 11/12 89/1.13 |
| 6,490,957 | B1 | | 12/2002 | Alexander et al. |
| 6,499,706 | B1 | | 12/2002 | Sherlock et al. |
| 6,585,201 | B1 | * | 7/2003 | Reed ................... B60R 11/0235 248/181.1 |
| 6,644,166 | B2 | | 11/2003 | Alexander et al. |
| 8,572,849 | B1 | | 11/2013 | Clark |
| 8,960,629 | B2 | * | 2/2015 | Rizk ...................... F16M 11/14 248/481 |
| 10,215,543 | B1 | | 2/2019 | Benson |
| 10,921,089 | B1 | | 2/2021 | Vabnick et al. |
| 2005/0081706 | A1 | | 4/2005 | Alford |

(Continued)

*Primary Examiner* — Christopher Garft
(74) *Attorney, Agent, or Firm* — Fredric J. Zimmerman (57) ABSTRACT

A stand for vertically aligning borehole charges on non-level surfaces. The stand has a support base. A ball and socket assembly includes a socket portion connected to the support base and a ball portion disposed in the socket portion. The socket portion includes a grip interface to press against the ball portion. A body is connected to the ball portion. A clamp is attached to the socket portion at an interface of the ball and socket assembly between the socket portion and the ball portion. The body is configured to contain a shaped explosive charge for making a borehole. The ball and socket assembly is substantially hollow. The clamp adjusts compression of the ball and socket assembly.

15 Claims, 6 Drawing Sheets

(56) References Cited

U.S. PATENT DOCUMENTS

| | | | |
|---|---|---|---|
| 2007/0010377 A1* | 1/2007 | Wu | A63B 69/16 |
| | | | 482/61 |
| 2011/0188925 A1 | 8/2011 | Komine | |
| 2013/0243517 A1* | 9/2013 | Watanabe | F16H 25/2021 |
| | | | 403/60 |
| 2017/0337789 A1 | 11/2017 | Rosenkvist | |

* cited by examiner

MULTIPLE ANGLE PIVOTING PLACEMENT (MAPP) STAND

ORIGIN OF THE INVENTION

The invention described herein was made in the performance of official duties by employees of the U.S. Department of the Navy and may be manufactured, used, or licensed by or for the Government of the United States for any governmental purpose without payment of any royalties thereon.

BACKGROUND

Field of the Invention

The present invention relates to tools for handling shaped explosive charges, and, in particular, to a pivoting placement stand to enable a vertical borehole to be made using a conical shaped charge on uneven terrain.

Description of the Background

Military and law enforcement personnel who work in bomb disposal units are frequently required to contend with explosive hazardous devices. Explosive hazardous devices include improvised explosive devices (IEDs), unexploded ordnance, homemade explosives, or other explosive related items that are located underwater or on land. These devices pose a threat to personnel and property due to the destructive potential of the explosive materials and compounds located within them. IEDs are terrorist devices, and as such, are frequently found in highly populated areas where de-arming the device greatly increases the risk of collateral damage to both people and property. The dangerous task of de-arming such devices is often exacerbated by the emplacement of IEDs in challenging positions or orientations. For example, an IED may be buried in rugged, non-level terrain.

Personnel who are responsible for disarming or rendering safe such explosive hazardous devices utilize explosive disruption devices or special tools in order to carry out these types of operations. Some of these devices or tools may include explosive disruption tools to disrupt and preserve the explosive train as evidence for forensic purposes. Many times, the success of a successful "render safe" operation depends on the speed at which the components of the explosive train are separated.

For explosive ordinance disposal (EOD) purposes, explosive charges may be placed inside a borehole to remotely remove buried energetic threats. A shaped charge is used to create the borehole. An excavation charge is placed in the borehole to unearth/expose the target without sympathetic detonation of the target. The depth of the borehole and the distance the borehole is away from the threat dictates the required size of the charge, which relates to the success of removal. Therefore, making vertical boreholes is essential for overall success.

Existing stands used to hold conical shaped charges to make boreholes are rigid and are difficult to emplace, robotically, using a single gripper and manipulator on uneven or unleveled terrain. For shaped charges requiring standoff distances greater than a few inches, a rigid stand may easily tip over. However, even if a rigid stand does not tip over, on uneven terrain, the borehole may not be vertically straight down. Therefore, a need exists for a device to make a vertical borehole on uneven terrain.

SUMMARY

A mounting assembly may be provided for many different types of devices. The present disclosure relates to a mounting assembly provided for a shaped charge used in EOD operations. The shaped charge is contained in a body of the mounting assembly. The body is in turn coupled to a ball and socket assembly, which in turn is coupled to a base. The base may be arranged on, and optionally fastened to a surface, such as uneven or unleveled terrain. The ball and socket assembly allows the body, and thus the shaped charge therein, to be moved relative the terrain by for example a tilt and/or a rotational movement to ensure vertical alignment of the shaped charge.

It is an object of the present invention to provide a mounting assembly for a shaped charge used in EOD operations that may be emplaced, robotically, on uneven or unleveled terrain using a single manipulator arm. It is a further object of the present invention to provide a mounting assembly for a shaped charge used in EOD operations, wherein the mounting assembly is lockable relative to a base of the mounting assembly to ensure vertical alignment of the shaped charge. It is a further object of the present invention to provide a locking mechanism that is robust and strong without requiring unreasonable high level of tightening and, in an exemplary embodiment, being independent of the materials used in the mounting assembly.

It is another object of the present invention to provide a ball joint assembly that is supported on or is for mounting on uneven or unleveled terrain, and connects to a body containing a shaped charge used in EOD operations that will allow a user or operator to easily and quickly adjust positioning of the body. The ball joint assembly thereby provides an operator with the ability to position to body relative to the base in a number of positions around and across the ball joint to ensure vertical alignment of the shaped charge.

It is an aspect of the invention to provide a Multiple Angle Pivoting Placement (MAPP) stand to make a vertical borehole using a conical shaped charge on uneven terrain. The MAPP concept allows a vertical borehole to be made and to robotically emplace the MAPP stand using a single manipulator arm.

According to an aspect of the invention, a Multiple Angle Pivoting Placement (MAPP) stand includes a bottom piece having a central hole. A ball and socket assembly is attached to the bottom piece over the central hole. The ball and socket assembly includes a socket portion connected to the bottom piece and a ball portion disposed in the socket portion. The ball and socket assembly is substantially hollow. A body having a top and bottom and an interior volume is connected to the ball portion. The body is configured to contain a shaped explosive charge. A clamp is attached to the socket portion at an interface of the ball and socket assembly between the socket portion and the ball portion. The clamp adjusts compression of the ball and socket assembly.

According to an exemplary stand for vertically aligning borehole charges on non-level surfaces, the stand has a support base. A ball and socket assembly is made up of a socket portion connected to the support base and a ball portion disposed in the socket portion. The socket portion includes grips at an interface with the ball portion in order to press against the ball portion. A body is connected to the ball portion. A clamp is attached to the socket portion at an interface of the ball and socket assembly between the socket portion and the ball portion. The body is configured to contain a shaped explosive charge for making a borehole.

The ball and socket assembly is substantially hollow. The clamp adjusts compression of the ball and socket assembly.

According to an aspect of the invention, a charge stand includes a support base having a hollow center. A cup is connected to the support base. The cup defines a partly spherical shape and has an open bottom proximal to the support base and a lip distal from the support base. The charge stand further includes a cylindrical body having an interior volume for containing a shaped explosive charge and an end having a ball that is shaped to substantially match the partly spherical shape of the cup. The ball is disposed in the cup. A clamp is disposed around the lip of the cup to adjust compression of the cup to the ball.

DETAILED DESCRIPTION OF EXEMPLARY EMBODIMENTS

Generally, EOD tools used by warfighters utilize explosive charges to disable or incapacitate a device. Existing stands used to hold conical shaped charges to make boreholes are rigid and are difficult to emplace, robotically, using a single gripper and manipulator on uneven or unleveled terrain. For shaped charges requiring standoff distances greater than a few inches, a rigid stand can easily tip over. If a rigid stand does not tip over on uneven terrain, the borehole will not be vertically straight down. A need exists to make a vertical borehole on uneven terrain. The MAPP concept aims to allow a vertical borehole to be made and to emplace, robotically, the device using a single manipulator arm.

The MAPP concept includes a flat bottom plate with a hole. A ball and socket assembly secures the flat bottom plate to the conical shaped charge bottom. Rubber grips interface with the ball and socket interface. A zip tie, band clamp, etc. is secured around the ball and socket area to adjust the compression of the rubber grips to the plastic ball, depending on the distance and weight of the conical shaped charge from the ground surface. A single manipulator arm lowers the entire charge and stand to the ground surface, and adjusts the stand until the charge is straight up and down.

Figure 1:
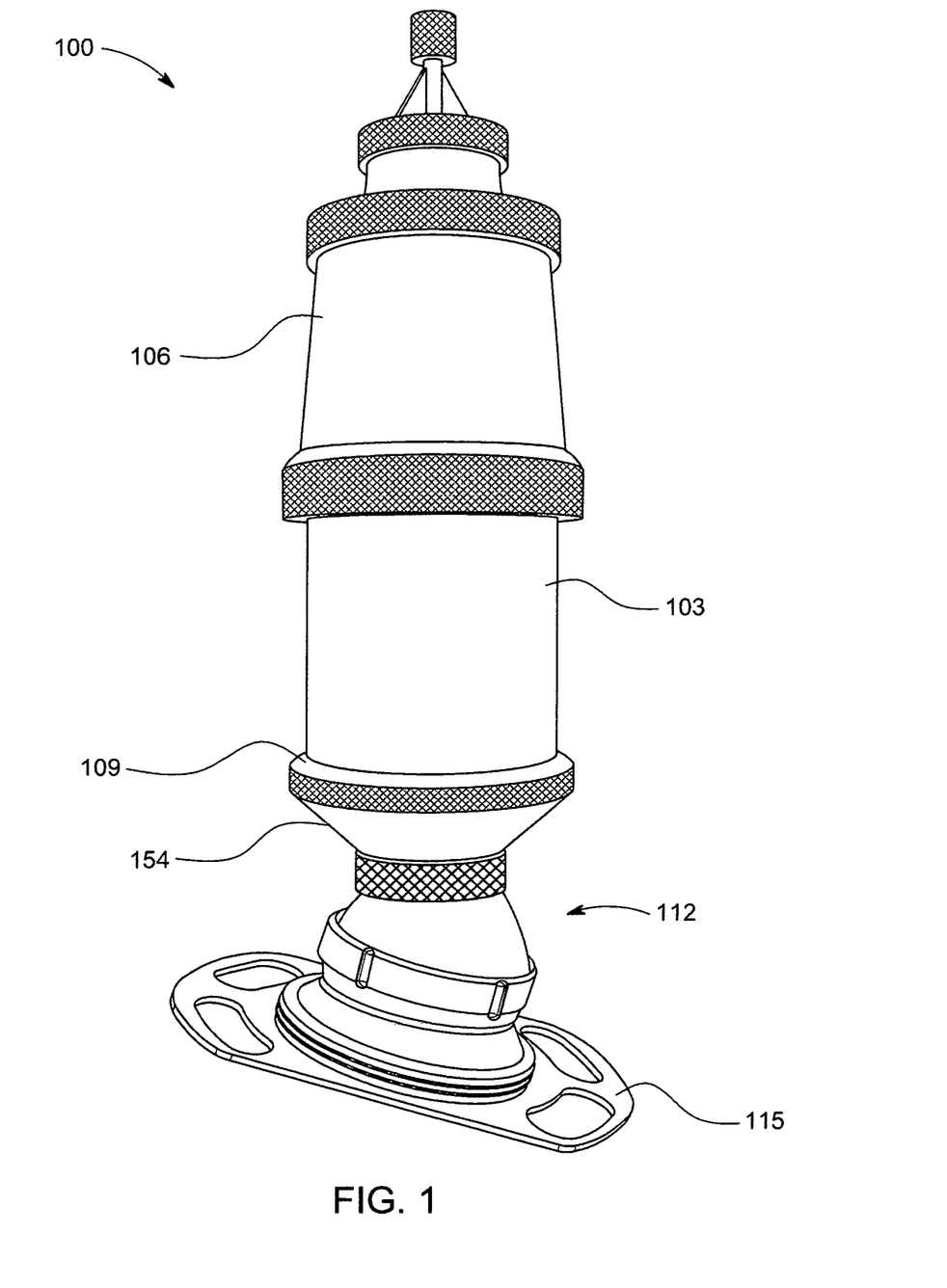
FIG. 1 is a side view of a Multiple Angle Pivoting Placement (MAPP) stand according to devices herein.

Referring to FIG. 1, a Multiple Angle Pivoting Placement (MAPP) stand, indicated generally as 100, includes a body 103 having a top 106 and a bottom 109. The bottom 109 is connected to a ball and socket assembly 112. In some exemplary embodiments, the body 103 may be a hollow cylindrical sleeve made of metal or plastic defining an interior volume and may include threads configured to connect the body 103 to the ball and socket assembly 112. A shaped charge (not shown), such as a conical shaped charge, may be disposed at the top 106 of the body 103. The body 103 is employed to create a standoff distance from the shaped charge at the top 106 to the surface on which the MAPP stand 100 is placed. The ball and socket assembly 112 is connected to a bottom piece 115, which provides a support base for the MAPP stand 100. The ball and socket assembly 112 provides a joint between the body 103 and the bottom piece 115.

Figure 2:
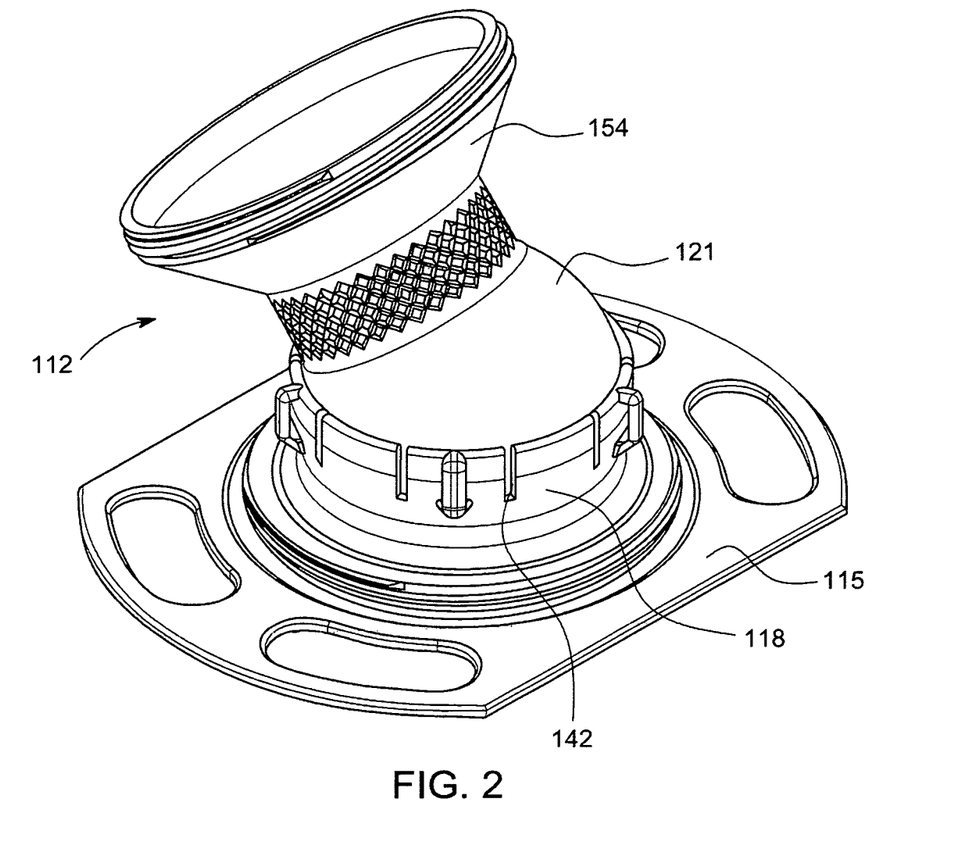
FIG. 2 is a perspective view of a ball and socket assembly according to devices herein.
Figure 3:
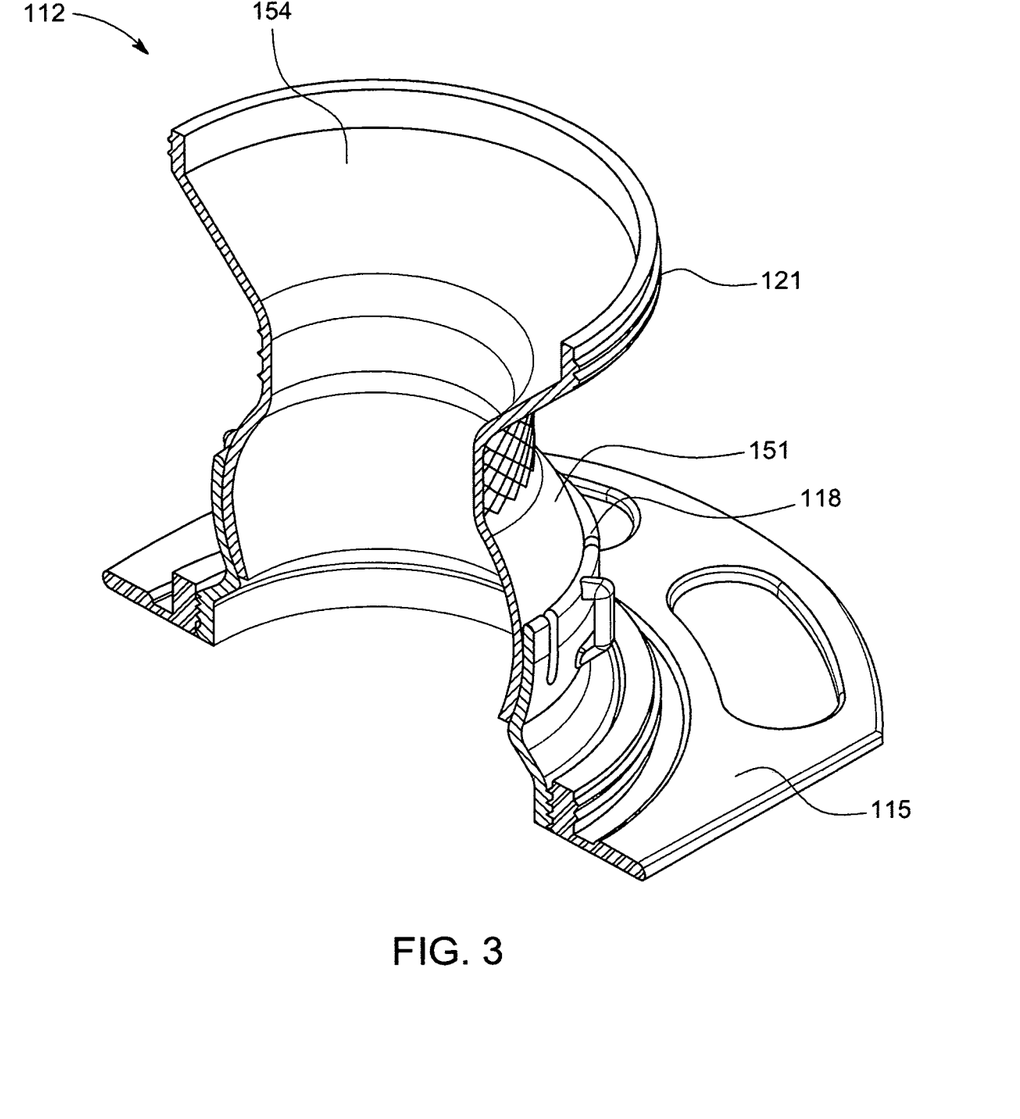
FIG. 3 is a cut-away view of the ball and socket assembly of FIG. 2.

FIGS. 2 and 3 show the ball and socket assembly 112. The ball and socket assembly 112 includes a socket portion 118 connected to the bottom piece 115 and a ball portion 121 disposed in the socket portion 118. In some exemplary embodiments, the socket portion 118 may be a separate piece connected to the bottom piece 115 by a threaded connection or other mechanical connection. In some embodiments, the socket portion 118 may be integrally formed with the bottom piece 115. As best seen in FIG. 3, the ball and socket assembly 112 may be substantially hollow.

Figure 4:
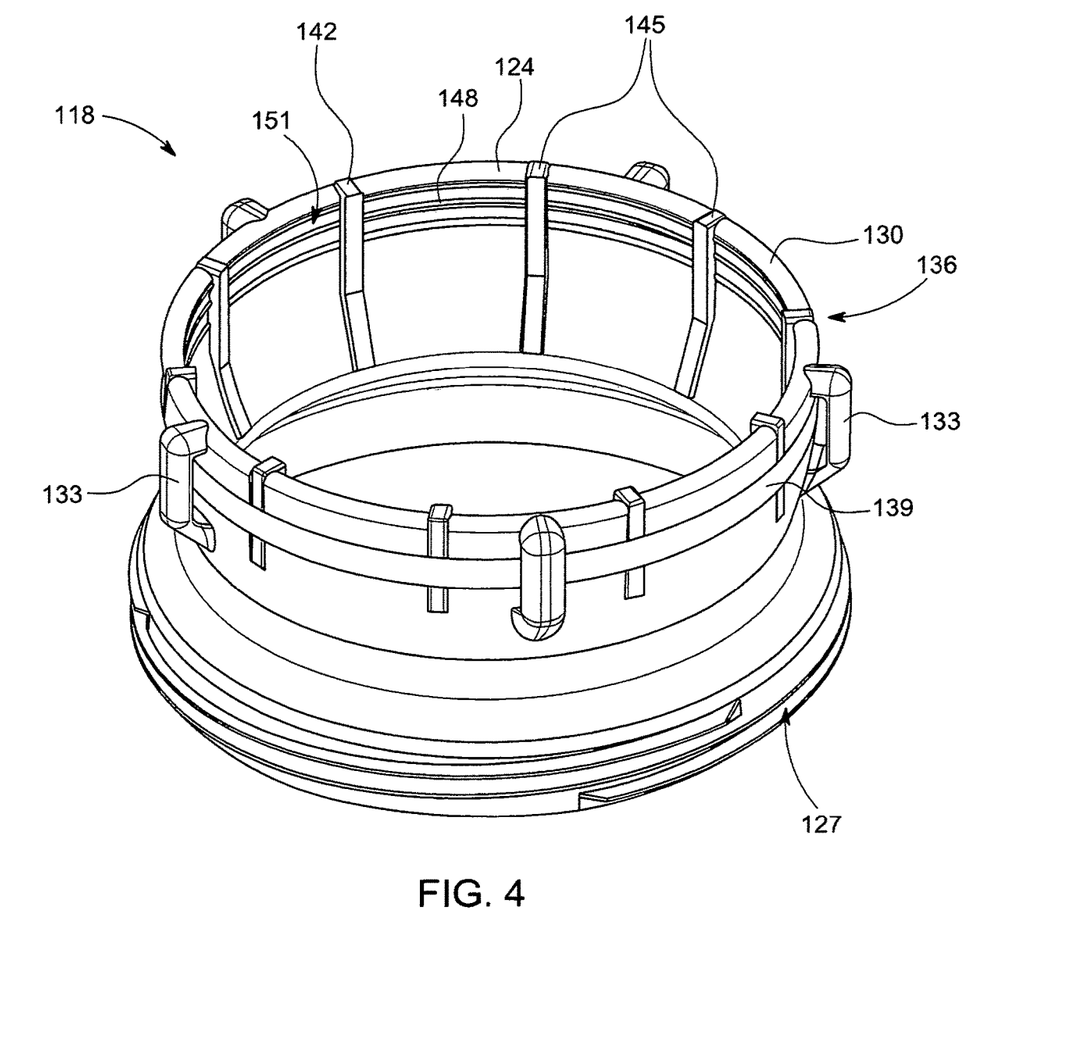
FIG. 4 is a perspective view of a socket portion of a ball and socket assembly according to devices herein.

Referring to FIG. 4, the socket portion 118 includes a cup 124 that defines a partly spherical shape having an open bottom 127 proximal to the bottom piece 115 and a lip 130 distal from the bottom piece 115. A plurality of loops 133 may be disposed around an outside periphery 136 of the cup 124 adjacent to the lip 130. A clamp 139 may be engaged to the loops 133. The clamp 139 may be a zip tie, band clamp, chord, etc. that can be secured around the ball and socket assembly 112. The clamp 139 may be used to adjust compression of the ball and socket assembly 112. A plurality of slots 142 may be formed in the lip 130. The slots 142 allow for the flexure of the socket portion 118 to accept the ball portion 121 during assembly. The slots 142 also allow the lip 130 of the cup 124 to be squeezed inwardly in order to apply compression to the ball and socket assembly 112. The slots 142 may be filled with grips 145, such as rubber grip strips prior to insertion of the ball portion 121. In some exemplary embodiments, a friction strip 148 may be provided around an inside periphery 151 of the cup 124 adjacent to the lip 130. The clamp 139 can adjust the compression of the grips 145 at an interface area of the ball and socket assembly 112 between the socket portion 118 and the ball portion 121 depending on the distance and weight of the conical shaped charge from the ground surface.

Figure 5:
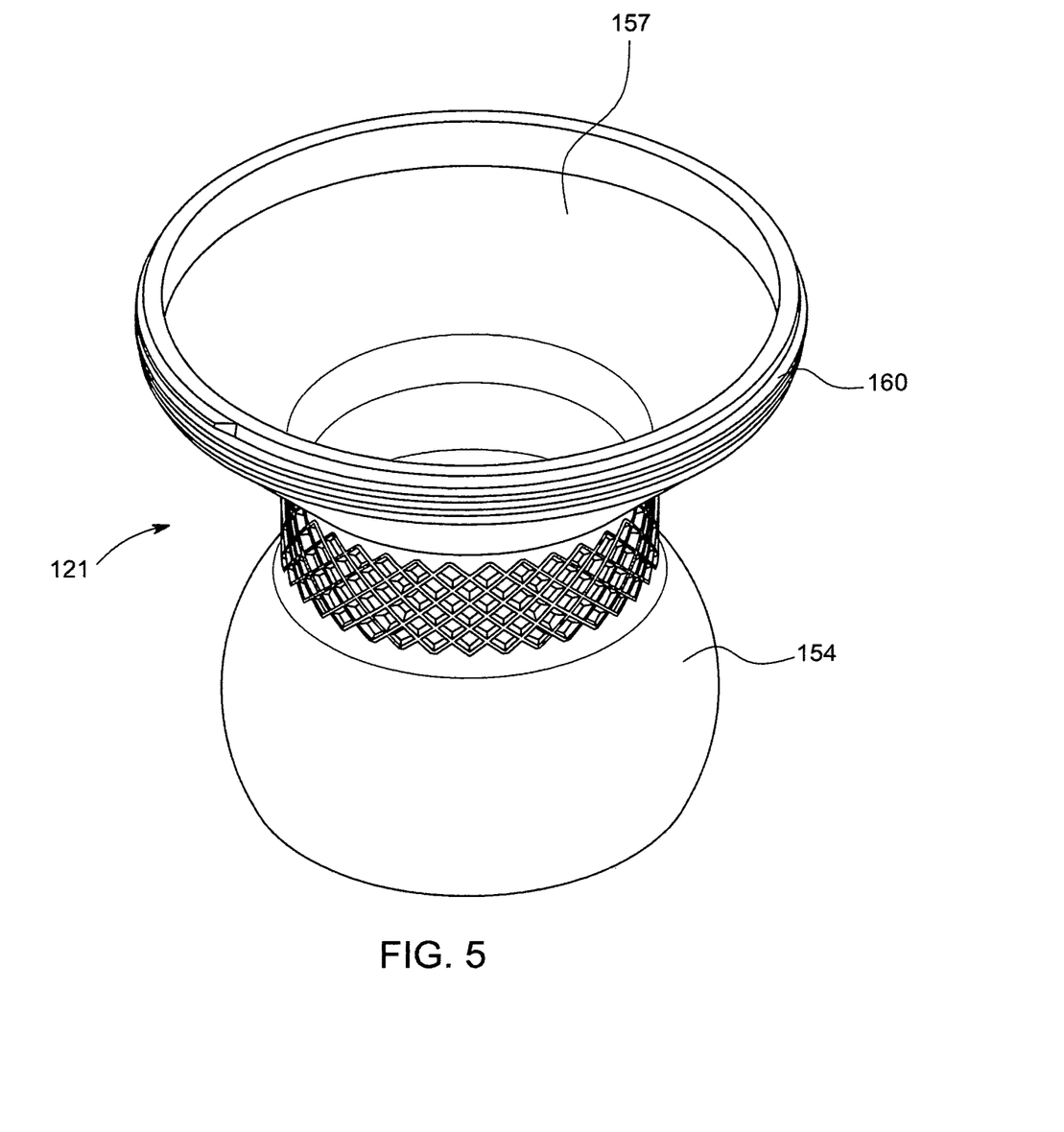
FIG. 5 is a perspective view of a ball portion of a ball and socket assembly according to devices herein.

Referring now to FIG. 5, the ball portion 121 of the ball and socket assembly 112 includes a ball 154 that is shaped to match, substantially, the partly spherical shape of the cup 124 in the socket portion 118 of the ball and socket assembly 112. The ball portion 121 may include a cone-shaped transition piece 157 from the ball 154 to the bottom 109 of the body 103 (see FIG. 1). In some embodiments, the ball 154 may be hollow, as shown in FIG. 3. In some exemplary embodiments, the ball 154 may have material in the interior of the ball. The ball 154 may be integrally formed with the cone-shaped transition piece 157 or may be mechanically attached thereto by a threaded connection 160 or other connections known to one of ordinary skill in the art.

Figure 6:
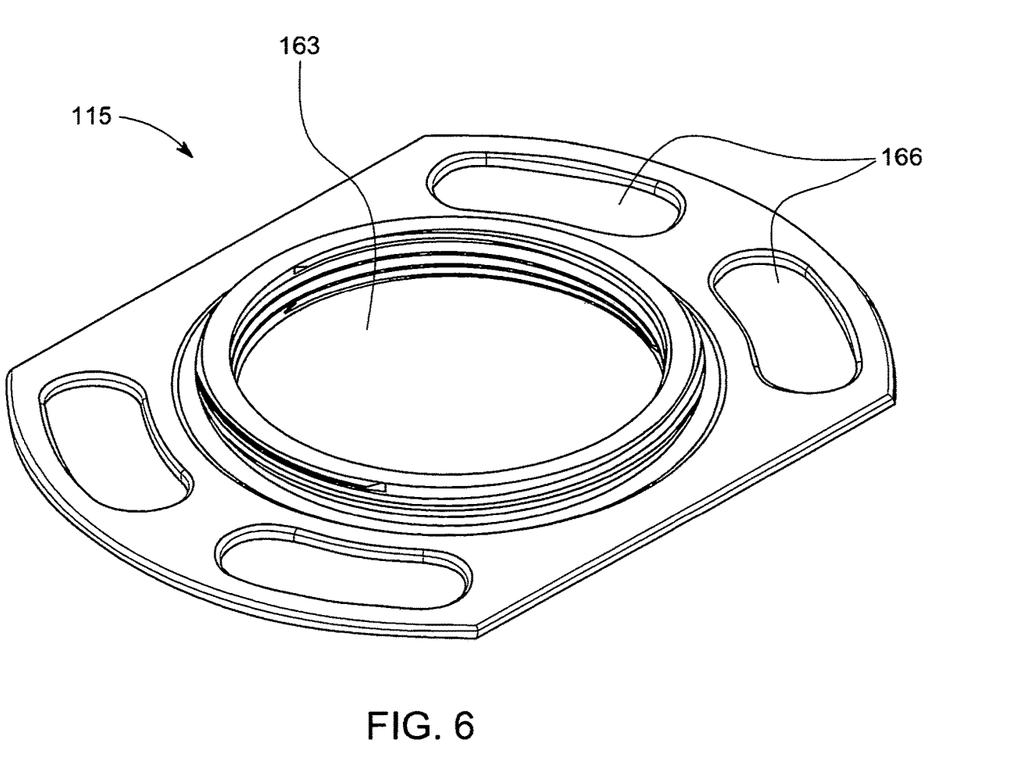
FIG. 6 shows a bottom piece according to devices herein.

FIG. 6 shows a bottom piece 115 according to devices herein. The bottom piece 115 has a central hole 163. The ball and socket assembly 112 is attached to the bottom piece 115 over the central hole 163. In some embodiments, the socket portion 118 of the ball and socket assembly 112 may be formed, integrally, with the bottom piece 115 or may be mechanically attached thereto by a threaded connection or other connections known to one of ordinary skill in the art. Commonly, the bottom piece 115 may be a flat plate and provides a support base for the MAPP stand 100. The bottom piece 115 may include one or more apertures 166 through which anchors may be inserted to secure the MAPP stand 100 to the ground.

It is contemplated that the MAPP stand 100 described herein may be manufactured of lightweight plastic and/or by 3D printing or other means now known or developed in the future. For example, some filaments that may be used for 3D printing include ABS (Acrylonitrile Butadiene Styrene) and Polylactic Acid, commonly known as PLA, and other materials. When superior strength is needed, a carbon fiber-infused nylon filament, such as NylonX® from MatterHackers, may be used. Each material will have different properties resulting in insignificant differences in final print dimensions due to differing thermal properties.

In use, a robotic device using a single manipulator arm lowers the shaped charge and MAPP stand 100 to the ground surface in a desired location. Using the single manipulator arm, the MAPP stand 100 may be adjusted until the charge is straight up and down, regardless of how level the ground may be. Then, the clamp 139 can be used to adjust compression of the ball and socket assembly 112 to lock the MAPP stand 100 in place and hold the body 103 and shaped charge vertically.

The invention has been described with references to specific exemplary embodiments. While particular values, relationships, materials, and steps have been set forth for purposes of describing concepts of the invention, it will be appreciated by persons skilled in the art that numerous variations and/or modifications may be made to the invention as shown in the disclosed exemplary embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present invention, various other embodiments as well as potential variations and modifications of the exemplary embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present exemplary embodiments are to be considered in all respects as illustrative and not restrictive.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises", "comprising", "includes", and/or "including", when used in this specification, specify the presence of stated features, integers, steps, operations, elements, and/or components, but do not preclude the presence or addition of one or more other features, integers, steps, operations, elements, components, and/or groups thereof. Further, the terms "automated" or "automatically" mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration but are not intended to be exhaustive or limited to the exemplary embodiments disclosed. Many modifications and variations will be apparent to those of ordinary skill in the art without departing from the scope and spirit of the described embodiments. The terminology used herein was chosen to best explain the principles of the exemplary embodiments, the practical application or technical improvement over technologies found in the marketplace, or to enable others of ordinary skill in the art to understand the embodiments disclosed herein.

For example, terms such as "right", "left", "vertical", "horizontal", "top", "bottom", "upper", "lower", "under", "below", "underlying", "over", "overlying", "parallel", "perpendicular", etc., as used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A Multiple Angle Pivoting Placement (MAPP) stand, comprising:
   a bottom piece including a central hole;
   a ball and socket assembly being attached to the bottom piece over the central hole, the ball and socket assembly comprises a socket portion connected to the bottom piece and a ball portion disposed in the socket portion,
   wherein the ball and socket assembly includes an interior portion, which is substantially hollow, open and absent obstructions;
   a body including a top and bottom and an interior volume, the body is connected to the ball portion, wherein the body is configured to contain a shaped explosive charge;
   a clamp being attached to the socket portion at an interface of the ball and socket assembly between the socket portion and the ball portion, wherein the clamp adjusts compression of the ball and socket assembly,
   wherein the interior portion of the ball and socket assembly is aligned with the central hole to form a non-occluded, internal pathway,
   wherein the socket portion is integrally formed with the bottom piece,
   wherein the socket portion includes a lip, and
   wherein a plurality of slots are formed in the lip;
   a plurality of grips being disposed around an inside periphery of the socket portion,
   wherein the grips are situated in the plurality of slots; and
   a plurality of loops being disposed around an outside periphery of the socket portion.

2. The MAPP stand according to claim 1, wherein the clamp is engaged in the plurality of loops.

3. The MAPP stand according to claim 1, wherein the clamp comprises one of a zip tie, a band clamp, and a chord.

4. The MAPP stand according to claim 1, wherein the grips are comprised of grip strips.

5. The MAPP stand according to claim 1, wherein the shaped explosive charge is located at the top of the body.

6. A system for vertically aligning borehole charges on non-level surfaces, comprising:

a shaped explosive charge;
a stand, the stand comprising:
   a support base; a ball and socket assembly comprising a socket portion being connected to the support base and a ball portion being disposed in the socket portion, wherein the socket portion includes a grip interface to press against the ball portion; a body being connected to the ball portion; a clamp being attached to the socket portion at an interface of the ball and socket assembly between the socket portion and the ball portion, wherein the body contains the shaped explosive charge for making a borehole, wherein the ball and socket assembly includes an interior portion, which is substantially hollow, open and absent obstructions, wherein the clamp adjusts compression of the ball and socket assembly; and wherein the grip interface comprises at least one grip and at least one friction strip; and a plurality of loops being disposed around an outside periphery of the socket portion.

7. The system according to claim 6, wherein the clamp is engaged in the plurality of loops.

8. The system according to claim 6, wherein the clamp comprises one of a zip tie, a band clamp, and a chord.

9. The system according to claim 6, wherein the grip is a rubber grip.

10. The system according to claim 6, wherein the support base comprises a flat plate having a central hole and at least one aperture to attach anchors.

11. A charge system, comprising:
a shaped explosive charge;
a stand, the stand comprising:
   a support base including a hollow center; a cup being connected to the support base, the cup defines a partly spherical shape and includes an open bottom proximal to the support base and a lip distal from the support base; a cylindrical body including an interior volume containing the shaped explosive charge and a first end having a ball that is shaped to substantially match the partly spherical shape of the cup, wherein the ball is disposed in the cup; a clamp being situated around the lip of the cup for adjusting compression of the cup to the ball, wherein the cup and the ball include an interior portion, which is substantially hollow, open and absent obstructions; a plurality of grips being disposed around an inside periphery of the cup adjacent to the lip; and a plurality of loops being disposed around an outside periphery of the cup adjacent to the lip.

12. The charge system according to claim 11, wherein the clamp is engaged in the plurality of loops.

13. The charge system according to claim 11, wherein the clamp comprises one of a zip tie, a band clamp, and a chord.

14. The charge system according to claim 11, wherein the plurality of grips are comprised of at least one of rubber grip strips and at least one friction strips.

15. The charge system according to claim 11, wherein the body further comprises a second end opposite the first end and the shaped explosive charge disposed at the second end.

* * * * *